A. ARMANDO.
Rocking Carriage.
No. 94,990. Patented Sept. 21, 1869.
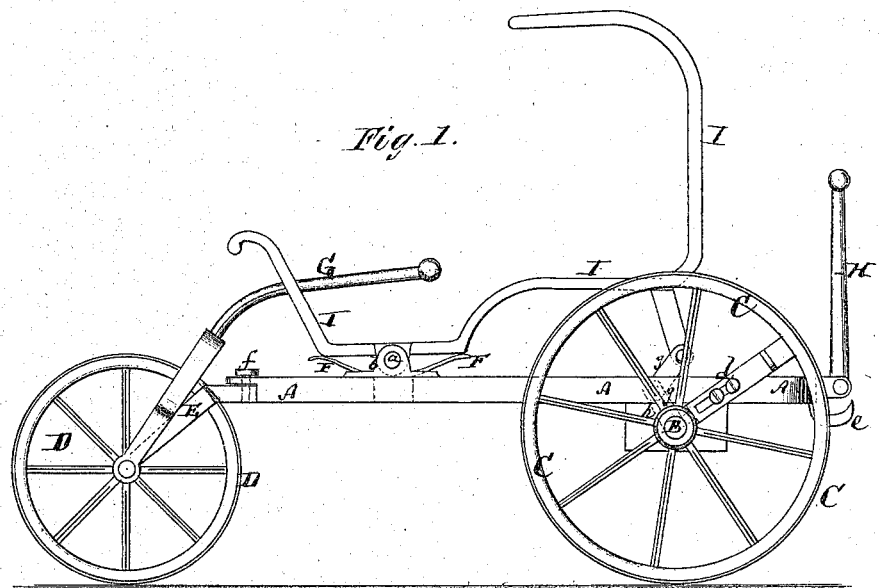
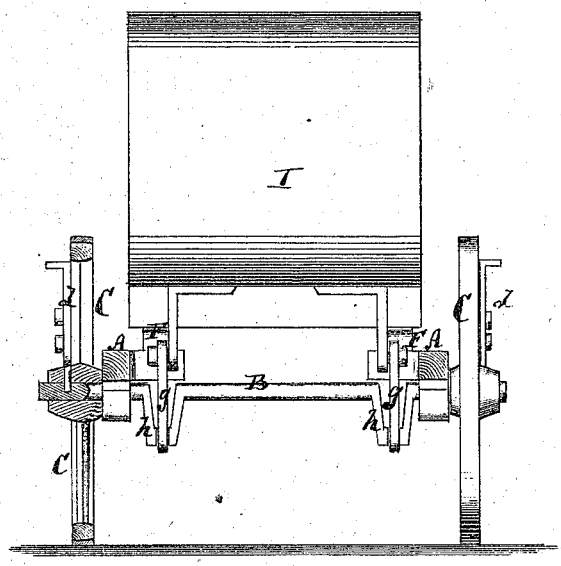
Witnesses: Geo. W. Mabee, Jno. K. Brooks
Inventor: A. Armando
Per [Attorneys]

United States Patent Office.

A. ARMANDO, OF NEW YORK, N. Y.

Letters Patent No. 94,990, dated September 21, 1869.

IMPROVED ROCKING CARRIAGE.

The Schedule referred to in these Letters Patent and making part of the same.

*To all whom it may concern:*

Be it known that I, A. ARMANDO, of the city, county, and State of New York, have invented a new and improved Rocking Carriage; and I do hereby declare that the following is a full, clear, and exact description thereof, which will enable others skilled in the art to make and use the same, reference being had to the accompanying drawings, forming part of this specification, in which—

Figure 1 represents a side view of my improved rocking carriage.

Figure 2 is a rear elevation, partly in section, of the same.

Similar letters of reference indicate corresponding parts.

A, in the drawing, represents the lower frame of the carriage.

B is the rear axle, carrying two wheels, C C, and hung in the frame A.

D is the front wheel, hung in a slotted frame, E, which is pivoted to the front part of A.

I is the carriage-body, pivoted by pins a to ears b, that project from the frame A, in front of the axle B.

The back part of the body E is, by means of rods g g, connected with cranks h of the axle B.

Springs F, in front and rear of the pivots a, tend to retain the carriage-body in a horizontal position.

The wheels C carry sliding bolts d, which can be pushed into apertures or notches of the axle B, to lock the wheels to the axle.

The frame E is provided with a steering-handle, G, which extends into the carriage.

A handle, H, is pivoted to the rear end of the frame A, and can be swung up and held out of the way by a suitable catch, e, as in fig. 1.

The person in the carriage can, by a rocking motion, propel the vehicle, and can steer the same, by means of the handle G.

The carriage may also be pushed or drawn forward, in which case the carriage-body will be rocked. When the bolts d are withdrawn from the axle B, the wheels will be loose, and the carriage-body will not rock while the vehicle is in motion.

The steering-frame E is locked by a pin, f, when the carriage is pushed.

To children this device will not only afford much amusement, but also, when they are propelled by others, much comfort and convenience.

Having thus described my invention,

I claim as new, and desire to secure by Letters Patent—

1. The bolts d on the wheels C of a rocking carriage, when provided to lock said wheels to the axle, substantially as herein shown and described.

2. The frame A, constructed as herein shown and described, crank-axle B, and wheels C, with the pivoted carriage-body I, springs F, steering-wheel D, and tiller G, all arranged and operating substantially as herein shown and described.

A. ARMANDO.

Witnesses:
 FRANK BLOCKLEY,
 ALEX. F. ROBERTS.